United States Patent

[11] 3,593,103

| [72] | Inventors | Edgar F. Chandler<br>Media, Pa.;<br>Arthur M. Roberts, Cherry Hill, N.J. |
|---|---|---|
| [21] | Appl. No. | 804,203 |
| [22] | Filed | Mar. 4, 1969 |
| [45] | Patented | July 13, 1971 |
| [73] | Assignee | General Electric Company |

[54] INVERTER SYSTEM WITH AUTOMATIC RIDETHROUGH
12 Claims, 6 Drawing Figs.

[52] U.S. Cl. .................................................... 321/2,
318/227, 318/345, 321/5, 321/18
[51] Int. Cl. .................................................... H02m 5/44
[50] Field of Search .................................... 318/138,
227, 230, 345; 321/5, 18, 2

[56] References Cited
UNITED STATES PATENTS

| 3,105,180 | 9/1963 | Burnett | 318/230 UX |
|---|---|---|---|
| 3,262,036 | 7/1966 | Clarke et al. | 318/138 X |
| 3,323,032 | 5/1967 | Agarwal et al. | 318/227 X |
| 3,343,063 | 9/1967 | Keeney, Jr. et al. | 321/5 |
| 3,344,326 | 9/1967 | Risberg | 321/5 X |
| 3,394,297 | 7/1968 | Risberg | 318/230 X |
| 3,413,538 | 11/1968 | Hodges | 321/2 |
| 3,465,234 | 9/1969 | Phadke | 321/18 X |
| 3,477,002 | 11/1969 | Campbell | 318/227 |

*Primary Examiner*—William M. Shoop, Jr.
*Attorneys*—J. Wesley Haubner, Albert S. Richardson, Jr., Melvin M. Goldenberg, Frank L. Neuhauser and Oscar B. Waddell

ABSTRACT: For enabling a variable frequency electric power inverter to ride through a temporary loss or reduction of input power, means is provided for sensing an excursion of DC bus voltage beyond a predetermined normal magnitude range and for deriving first and second signals respectively proportional to the magnitude of the excursion and to its integral, and the frequency of the inverter is varied according to the difference between a given signal and the sum of said first and second signals.

INVENTORS:
EDGAR F. CHANDLER,
ARTHUR M. ROBERTS,
BY Albert S. Richardson Jr
ATTORNEY

INVERTER SYSTEM WITH AUTOMATIC RIDETHROUGH

BACKGROUND OF THE INVENTION

This invention relates to variable frequency electric power converters, and more particularly to an improved conversion system for energizing variable speed AC motor loads the stored energy of which is utilized in a manner that enables the converter to ride through momentary dips or interruptions of input power.

Solid-state variable frequency power supplies, commonly referred to as electric power converters or inverters, have now made practical the application of adjustable-speed drives using alternating current (AC) motors. A typical converter system includes a direct current (DC) rectifier for rectifying three-phase AC input voltage and for supplying the resulting DC bus potential to a solid-state inverter. The inverter commonly utilizes thyristors (silicon controlled rectifiers) as switching devices to generate an adjustable frequency output, with frequency adjustment being effected through a gating circuit supplying variable frequency pulses to the gates or control electrodes of the thyristors.

In many applications, variable speed AC motors must be energized by alternating voltage whose magnitude varies directly with frequency. There are several known techniques for accomplishing this end. According to one system, the inverter is supplied with DC voltage having a magnitude which is varied proportionately and substantially concurrently with variations in the operating frequency of the inverter. Another technique achieves a voltage variation directly with frequency by phase control of the gating signals applied to the thyristors in the inverter, and thus does so independently of minor variations in input DC voltage to the inverter. While these and other schemes are generally satisfactory under normal operating conditions, they are insufficient of themselves to ensure successful operation under all conditions that may be encountered in practice.

Malfunctions are possible under conditions falling in two general categories: coast down, and regeneration. To illustrate coast down, suppose that input power fails, whereupon the DC bus voltage supplying the inverter tends to collapse. As the inverter attempts to continue driving the motor load at nominated speed, the relatively small amount of energy stored in the associated commutating circuits is quickly consumed and the ability to commutate its thyristors is seriously degraded. There is consequently a risk of inverter failure (known as a "shoot through") which might necessitate a total system shutdown even though the loss of input power was only momentary. The controls provided for maintaining a constant magnitude-to-frequency ratio of the output voltage are no help when the DC bus voltage abruptly collapses, and the resulting reduction of motor excitation introduces an additional risk of stalling. Adding batteries to sustain the DC bus voltage in the event of a short term reduction or loss of input power is undesirable because of extra cost and maintenance.

To illustrate an adverse regeneration condition, suppose that an operator abruptly lowers the inverter frequency. Assuming that the rate of frequency reduction is greater than the natural coast-down rate of the motor load, the load will begin to overhaul and the connected motors will act like generators returning electrical energy through the inverter to the DC bus. If the consequent rise of DC bus voltage were excessive, the thyristors in the inverter would be required to block voltage over their ratings and might fail. Furthermore, abnormally high voltages on the motor windings tend to cause saturating currents therein which may exceed the commutating ability of the inverter. In the event of commutation failure (shoot through), system breakdown occurs.

Accordingly, it is a primary object of our invention to provide improved means for systematically controlling the exchange of electrical and mechanical energy between a variable frequency static inverter and its variable speed rotating load during periods of sudden and abnormal increase or decrease of the input power to the inverter.

It is a further object of the present invention to automatically regulate inverter operation in a manner that will enable the inverter to coast during transient source or load disturbances and thereafter to return to normal without risking malfunctions of a kind that result in complete loss of service.

SUMMARY OF THE INVENTION

Briefly stated, in accordance with one aspect of our invention, we provide a control circuit for a variable frequency inverter having a plurality of controlled switching elements interconnecting a DC bus and a set of AC terminals, the DC bus normally being energized by a source of electric power and the AC terminals being adapted to be connected to a variable speed electric motor. The control circuit, in one form, comprises first means for supplying said switching elements with gate pulses which turn on said elements in a predetermined sequence and at a desired frequency; means for providing a reference signal of variable magnitude; means responsive to the voltage of said DC bus for providing a first signal representing the magnitude of deviation of said voltage from a given level and a second signal representing the integral of that magnitude; and means for varying the frequency of said first means according to the algebraic sum of said first, second and reference signals.

In one form, our control circuit includes a voltage deadband circuit, proportional amplifying means, and integrating amplifying means for deriving said first and second signals. The deadband circuit produces a control signal of a certain polarity when the DC bus voltage is below a lower voltage setpoint and of the opposite polarity when said voltage is above an upper voltage setpoint. In either event the magnitude of the control signal is proportional to the amount of voltage deviation beyond the corresponding setpoint, and it is applied to the proportional and integrating amplifying means which respectively achieve proportional and integral control of the inverter frequency. Means is also provided for ensuring a "soft" return of the inverter frequency to its original level when the DC bus voltage resumes a magnitude within the deadband. The limits of the deadband can be fixed or programmed in accordance with motor speed.

THE DRAWINGS

The various features and advantages of the invention will be more fully appreciated from the following description of the accompanying drawings in which like reference numerals identify like components, and in which.

DETAILED DESCRIPTION OF THE INVENTION

Figure 1:
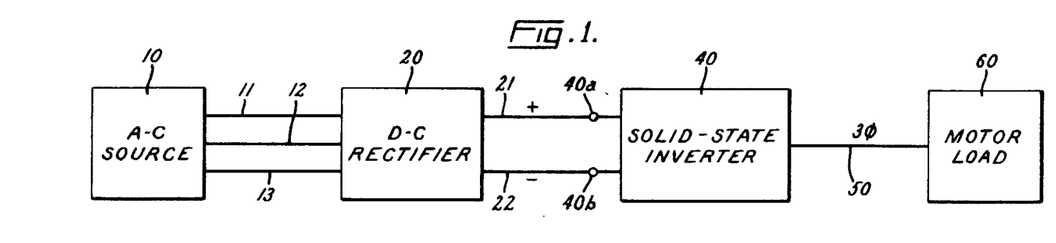
FIG. 1 is a schematic block diagram depicting the general arrangement of one form of inverter system.

Referring to FIG. 1, a typical converter system includes input conductor 11, 12, and 13, for receiving electric power from a suitable single-phase or polyphase AC power source 10 which may comprise a power transformer connected to the three-phase 60-hertz lines of an electric utility company. Input conductors 11, 12 and 13 carry this power to a power rectifier 20 which is operative to convert alternating voltage to unipolarity voltage for energizing a DC link shown as the relatively positive conductor 21 and the relatively negative conductor 22. The unipolarity voltage across conductors 21 and 22 is applied to respective DC input terminals 40a and 40b of a solid-state electric power inverter 40. Inverter 40 typically comprises a plurality of solid-state switching components suitably arranged and controlled to convert the DC input power into three-phase AC output power having adjustable frequency and voltage magnitude. The three-phase AC output is supplied over an output line 50 to a motor load 60, which may consist of one or more induction or synchronous motors driving rotating machinery, other synchronous electromechanical energy converters, or the like.

Figure 2:
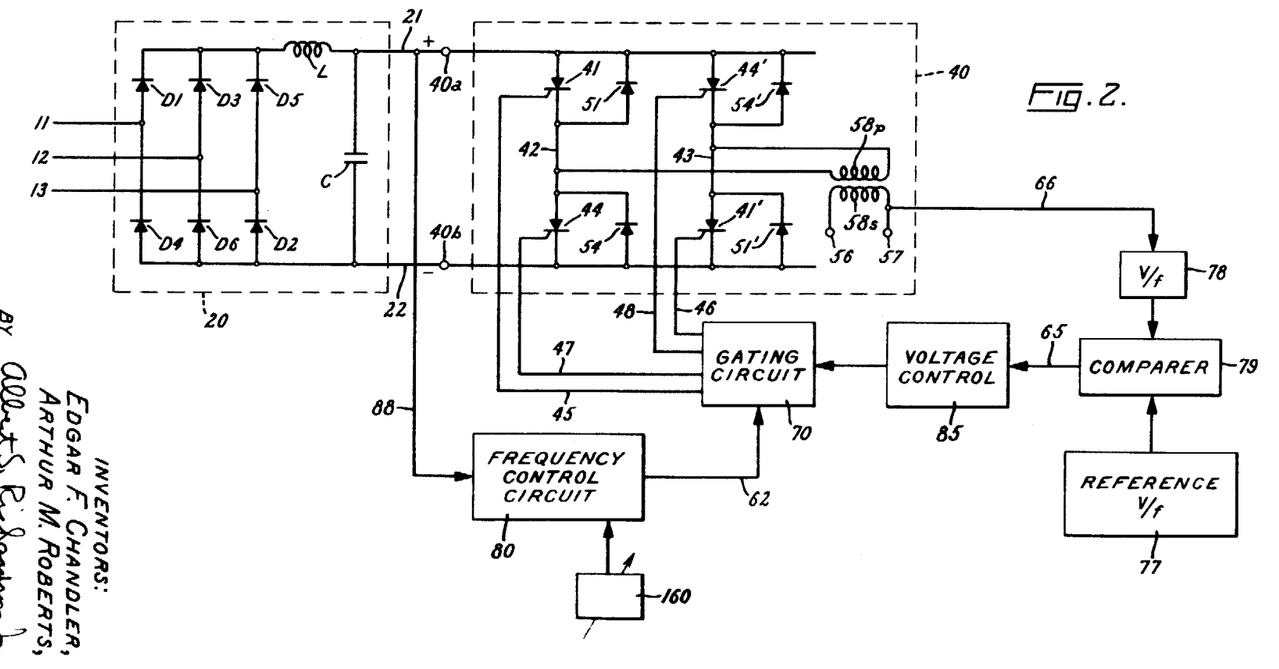
FIG. 2 is an expanded schematic drawing depicting in further detail some of the inverter circuits generally shown in FIG. 1.

FIG. 2 depicts a more specific form of the converter system. Inside the inverter 40 there is a DC bus connected to the pair of terminals 40a and 40b and hence energized by the unipolarity input voltage ($V_{DC}$). The DC bus is spanned by a plurality of similar bridges which are preferably coupled to the different windings of the connected motor(s) by way of the respective phases of a polyphase output transformer. For the sake of drawing simplicity, only one full bridge has been shown. It comprises two parallel pairs of series-connected alternately conducting, similarly poled controlled switching elements 41, 44 and 41', 44' which may in one form be silicon controlled rectifiers (SCR's). As can be seen in FIG. 2, the anodes of the SCR's 41 and 44' are connected in common to the positive input terminal 40a, while the cathodes of the respectively complementary SCR's 44 and 41' are connected in common to the negative input terminal 40b. The cathode of 41 and the anode of 44 are shown interconnected by a line 42, and corresponding electrodes of the second pair of SCR's 44' and 41' are interconnected by line 43. Each of the SCR's has its control electrode coupled over respective conductors 45, 46, 47, and 48 to the output of gating circuit 70 which will supply these elements with cyclic gate pulses to turn on the SCR's in a predetermined sequence and at a desired frequency. The single bridge depicted also includes a transformer primary winding 58p connected between the common lines 42 and 43, and the associated secondary 58s is adapted to be connected to one phase of the motor load via AC output terminals 56 and 57. Additionally, each leg of the bridge includes an individual feedback diode, such as diodes 51, 54, 51', and 54', connected across the SCR in inverse parallel relationship therewith.

In the single bridge depicted in FIG. 2, one phase of a symmetrical three-phase alternating voltage is developed at output terminals 56 and 57 by applying uniformly staggered 180° gating signals from gating circuit 70 to conductors 45, 47 and 46, 48 so that the SCR's are triggered or turned on in a predetermined numerical sequence. The gating circuit 70 is also arranged cyclically to supply similar sets of gating signals, respectively displaced 120 and 240 electrical degrees from the set for the illustrated bridge, to the other two bridges of the inverter 40. Suitable commutating means (not shown) is provided for turning off each of the SCR's at the end of its appropriate conducting interval. As a result, the frequency of the converter output voltage will depend on the timing of the gating signals from circuit 70, which in turn is a function of the frequency of a signal over conductor 62 from a frequency control circuit 80 whose operation is normally governed by a throttle 160.

As also shown in FIG. 2, a voltage control circuit 85 is provided for controlling the magnitude of the voltage at the converter output. In one form, voltage control may be achieved by comparing a signal from a reference source 77 with a feedback signal derived by a $V/H_z$ circuit 78 which is connected to the output terminals by suitable means shown as a line 66. The circuit 78 will supply a comparer 79 with a feedback signal whose magnitude is proportional to the magnitude-to-frequency ratio of the output voltage. A difference or error signal is applied over conductor 65 to voltage control circuit 85 which is connected to the gating circuit 70 or other appropriate means for adjusting the magnitude of output voltage so as to correct for the error. For a more detailed description of this form of voltage control, and also a more detailed showing of a typical multibridge inverter 40, reference is herein made to U.S. Pat. No. 3,343,063, issued Sept. 19, 1967, Marvin F. Keeney, Jr., and Charles S. Walker, inventors, which patent is assigned to the same assignee as the present invention.

During the normal operation of an inverter, the flow of energy is from the DC bus through the inverter 40 and to the motor load as AC output power. The input AC power over lines 11, 12 and 13, when rectified by unidirectional conducting components D1 through D6, and smoothed by inductor L, appears as a unidirectional voltage across a filter capacitor bank depicted by C in FIG. 2. Capacitor bank C maintains the normal DC bus voltage on conductors 21 and 22. By means of the alternately conducting legs of the inverter, this voltage is applied across the transformer primary 58p with alternating polarity, whereby the form of electric power is converter from DC to AC. Normally real power is transferred from the DC bus through the inverter to the load, but during regenerative conditions it can readily be appreciated that power may flow from the load (now acting as an energy source) back into the bus and charge the capacitor C.

When there is a complete or partial loss of input power, the DC bus voltage tends to rapidly diminish. In this event, according to one salient feature of our invention, the frequency of the inverter 40 is reduced so that the motors can transfer their rotational energy back through the inverter to the DC bus in an orderly manner, thereby allowing the inverter to continue operating while the motors coast down. By way of example, where the motor is an induction machine and thus is controlled by its rotor slip, normally the flow of electric power is from inverter 40 to motor load 60 and the induction motor(s) has a positive slip. During an input power outage, the frequency of the inverter 40 is suddenly dropped below the synchronous frequency of the motor to reverse its slip, thereby reversing the flow of power due to motor regeneration. The same effect is obtained with a synchronous motor whose torque angle is reversed by the reduction of inverter frequency. Assuming that the no-load losses of the inverter are small in relation to the losses of the connected motors, we can continue reducing frequency at a rate that allows the inverter losses and the regenerated energy to match one another as the motors gradually slow down, whereby the system will ride through a protracted (e.g., 5 second) loss of input power without risking motor stalling or inverter failure that might undesirably prolong loss of service and require complete shut down and restarting of the plant machinery after normal input power is restored.

Figure 3:
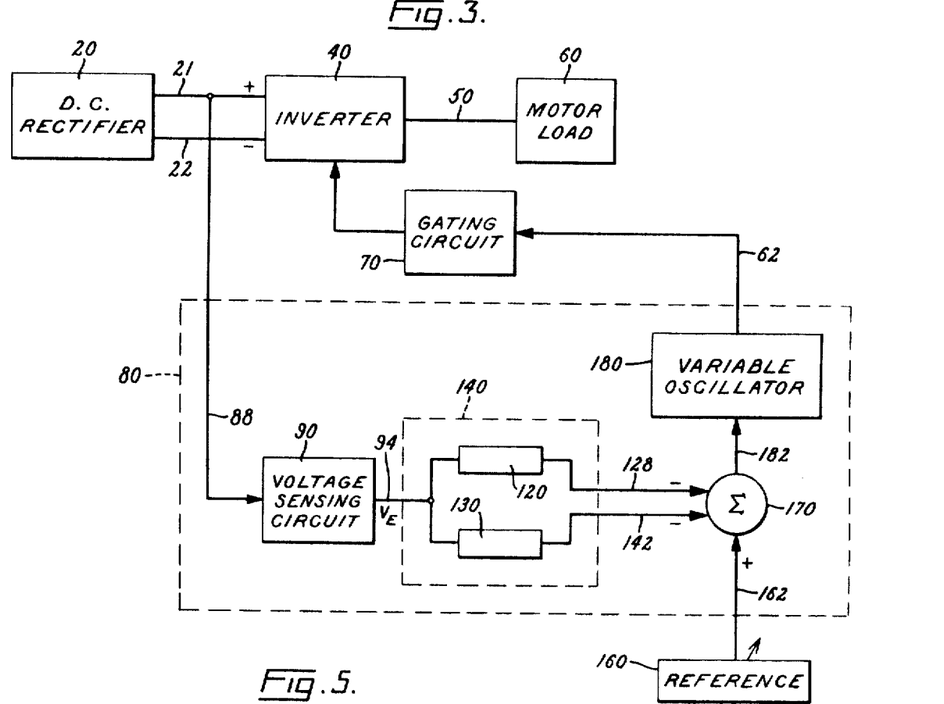
FIG. 3 is a schematic block diagram showing the general arrangement of one form of voltage sensitive frequency regulator provided by the invention.

Referring now to FIG. 3, we will now describe a frequency control circuit, generally depicted by numeral 80 in FIG. 2, for controlling the flow of variable frequency electric power between AC machine and inverter during the aforementioned conditions. In FIG. 3, the frequency control circuit of the invention includes voltage sensing means 90 which has an input coupled over line 88 to the DC bus and is arranged to produce a representative control signal having a magnitude which is proportional to the deviation of the bus voltage from a predetermined magnitude range. The representative control signal ($V_E$) is applied over conductor 94 to an amplifier circuit 140. Circuit 140 may include a first operational amplifying means 130 which is a proportional amplifier operative to provide a first "slip" signal over conductor 142. This signal over conductor 142 has a magnitude which is instantaneously proportional to the magnitude of the representative control signal $V_E$, and thus it is also a function of the amount of the DC bus voltage magnitude excursion beyond preset limits. Circuit 140 may also include a second operational amplifying means 120 which is an integrating amplifier operative to provide a second "slew" signal over conductor 128. The slew signal over conductor 128 has a magnitude equal to the integral of the magnitude of the representative control signal $V_E$. Both of the conductors 142 and 128 are coupled to summation means 170 where the sum of the slip and slew signals is subtracted from a given reference signal which is supplied thereto over conductor 162 from the associated throttle 160. It will be understood that the magnitude of this reference signal is programmed or varied manually during normal inverter operation to change the frequency of the signal supplied to gating circuit 70 and thus to change the operating frequency of the inverter as desired. The frequency control circuit 80 also includes a variable frequency source or oscillator 180 having input means 182 for receiving the aforesaid first second and reference signals, and the oscillator 180 is operative to provide over the conductor 62 a periodic signal whose frequency depends on the algebraic sum of the various input signals. The conductor 62 is shown connected to the gating circuit 70 whose frequency tracks that of the oscillator 180, whereby the actual frequency of the output voltage of the inverter 40 is determined by the frequency of 180.

Figure 4:
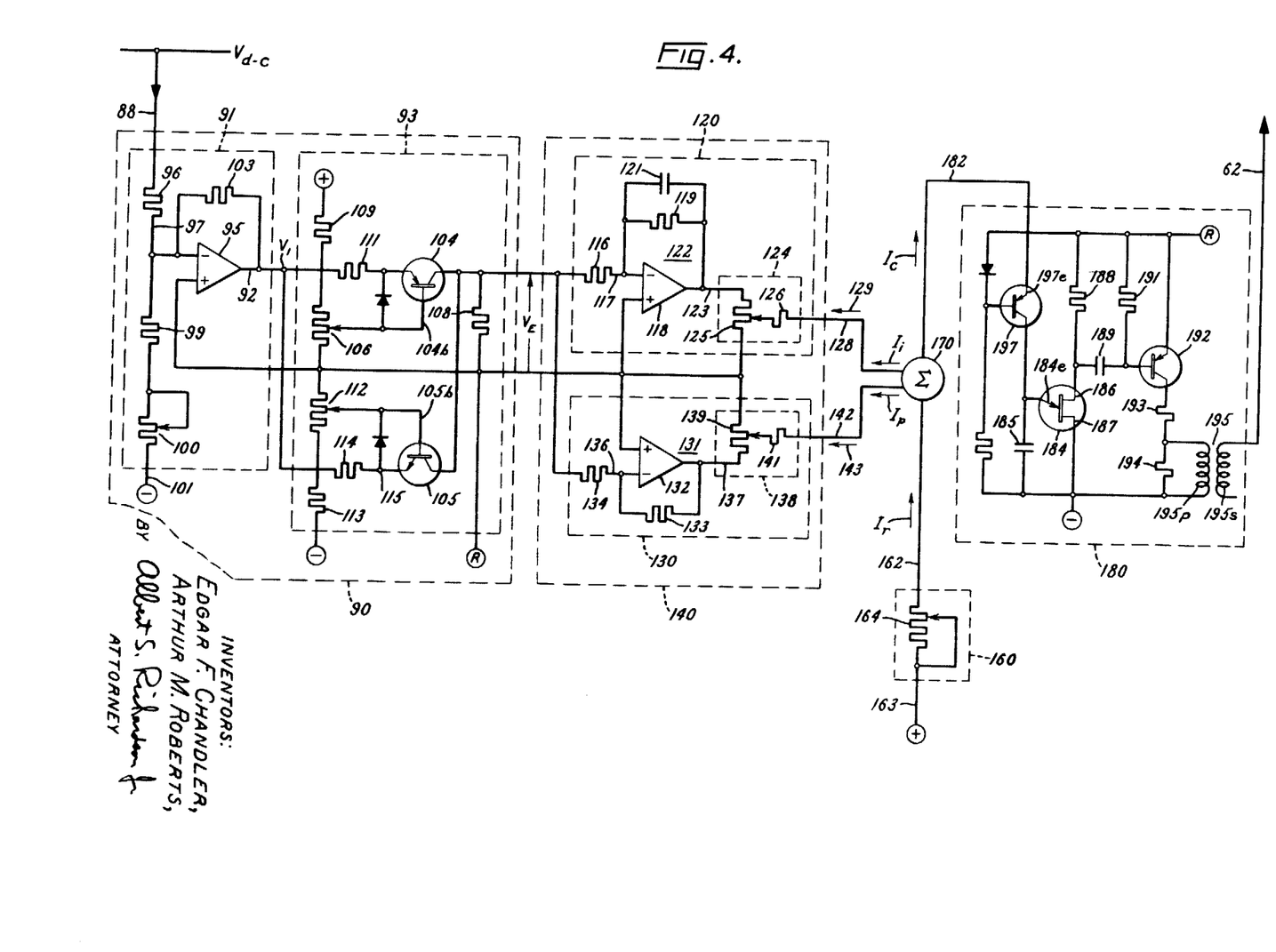
FIG. 4 is an expanded schematic drawing showing in further detail one form of regulator circuitry generally shown in FIG. 3.

FIG. 4 shows a more detailed representation of a practical embodiment of the control circuitry 80. As depicted therein, the voltage sensing circuit 90 includes an input sensing and converting circuit 91 for monitoring the DC bus to which it is coupled by the conductor 88 and for converting the bus voltage $V_{DC}$ to a much lower but proportional feedback signal $V_1$, and a voltage level sensing and control circuit 93 for sensing undervoltage and overvoltage conditions of the DC bus, and for providing the representative control signal $V_E$ over conductor 94. The input sensing and converting circuit 91 includes a linking network connected across the DC bus and a high gain operational amplifier 95. The network includes conductor 88, resistors 96, 99 and 100, and conductors 97 and 101 as shown. The negative input terminal of the amplifier 95 is connected to conductor 97, and the other input terminal is connected to a reference terminal R whose potential is midway between that of the positive (+) and negative (−) terminals of a suitable supply voltage source. The values of linking resistors 96, 99, and 100 are chosen such that the amplifier output voltage over conductor 92 (i.e., the feedback signal $V_1$) is zero with respect to R whenever the DC bus voltage has a predetermined nominal magnitude (e.g., 400 volts). Rheostat 100 is set to provide such a balance which obtains when current supplied to the amplifier 95 through the relatively positive side of the DC link just cancels the threshold current drawn from R via the rheostat 100 and conductor 101, it being understood that the negative supply voltage terminal (−) is connected in common with the negative conductor 22 of the DC link. When $V_{DC}$ decreases from normal, the current into the negative terminal of the operational amplifier correspondingly decreases, and thus the output $V_1$ goes from zero to a positive voltage proportional to the decrease. When $V_{DC}$ increases above normal, the amplifier input increases, and $V_1$ changes to some proportionately negative value with respect to R. Hence, any change in the DC bus voltage form some predetermined nominal value is immediately reflected by the feedback signal $V_1$.

The feedback signal $V_1$ is applied to voltage level sensing and control circuit 93, which is essentially a voltage deadband circuit that responds to undervoltage conditions beginning at a lower or minimum voltage setpoint. In the form depicted in FIG. 4, circuit 93 comprises a pair of transistors 104 and 105. Transistor 104 provides undervoltage sensing and control, and transistor 105 provides overvoltage sensing and control. With respect to the transistor 104, the voltage and current potential at its base 104b is controlled by a bias network connected to the +, R and − supply voltage terminals. A rheostat 106 in the positive half of this network is coupled to 104b to provide a reference voltage therefor. So long as $V_1$ is not more positive than this reference, transistor 104 is reverse biased and blocks current. However, if $V_1$ exceeds the reference due to the magnitude of $V_{DC}$ falling below a preset limit (which limit is established by rheostat 106), 104 begins to conduct current through a resistor 108 and will thus establish on conductor 94 a control signal $V_E$ whose polarity is positive with respect to R and whose magnitude is substantially proportional to the difference between $V_{DC}$ and the lower voltage setpoint. Overvoltage sensing and control is achieved in much the same manner. Thus, with respect to the transistor 105, the reference potential at its base 105b is determined by a rheostat 112 in the negative half of the bias network 106, 10., 112, and 113. So long as $V_1$ is not more negative than this reference level, transistor 105 is turned off. But when $V_1$ has a negative value greater than the reference due to the magnitude of $V_{DC}$ rising above another preset limit (established by rheostat 112), 105 will begin to conduct current through resistor 108, thereby establishing on the conductor 94 a control signal $V_E$ whose polarity is relatively negative and whose magnitude is substantially proportional to the difference between $V_{DC}$ and the upper voltage setpoint. Thus the circuit 93 establishes a normal magnitude range or deadband for the DC bus voltage. If the magnitude of $V_{DC}$ is within this range; $V_E$ is zero, but any deviation therefrom causes 93 to produce a control signal having a magnitude proportional to the amount of deviation and a polarity indicative of the direction of deviation.

Figure 5:
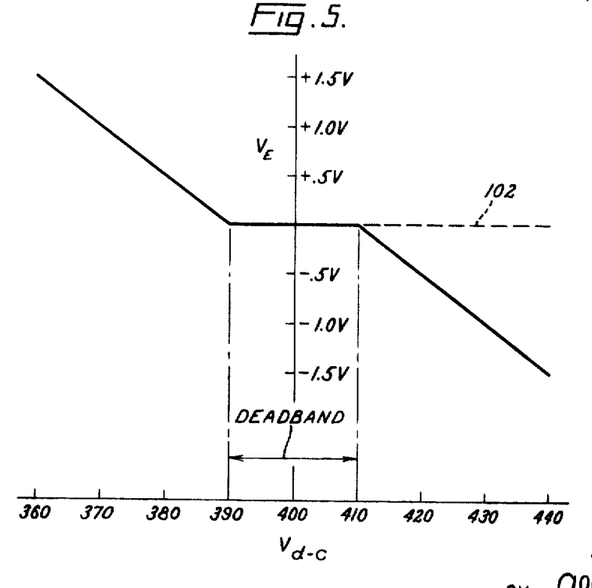
FIG. 5 depicts the typical operating characteristics of the voltage sensing means or deadband circuit shown in FIGS. 3 and 4.

By way of example, one typical voltage sensing circuit 90 monitored a DC bus normally energized to supply +400 volts to inverter 40. A typical deadband circuit performance curve is depicted in FIG. 5 and shows that for a bus voltage between 390 volts and 410 volts, $V_E$ remains zero. For a bus voltage under 390 volts, $V_E$ goes positive in proportion to the deviation, and for a bus voltage over 410 volts, $V_E$ goes negative in proportion to the DC bus change. If desired, the deadband can be extended in either direction, as is illustrated in FIG. 5 by the broken line 102 for a coast-down control where the predetermined normal magnitude range includes any magnitude of $V_{DC}$ above the lower setpoint of 390 volts.

In the amplifier circuit 140 the representative control signal $V_E$ is simultaneously applied to the proportional amplifying and control circuit 130 and to the integrating amplifying and control circuit 120. As is shown in FIG. 4, the proportional or slip amplifier 131 comprises an operational amplifier 132 similar to the operational amplifier 95, and a feedback resistor 133 is coupled between the negative input terminal and the output terminal of this amplifier. A current limiting resistor 134 has one end coupled to conductor 94 to receive the representative control signal produced by voltage sensing circuit 90 and has its other end coupled over conductor 136 to the first input to operational amplifier 132. The gain of this operational amplifier is controlled by the resistance ratio of 133 to 134. The output from amplifier 131 is proportional to $V_E$, and it is applied over a conductor 137 to a transfer circuit 138. Transfer circuit 138 includes a rheostat 139 having one fixed end coupled to conductor 137, another fixed end coupled to the supply voltage reference terminal R, and a movable tap coupled to a resistor 141. Transfer circuit 138 operates to convert or transfer the output voltage from amplifier 131 to a current usable to effect a change in oscillator frequency. Additionally, the adjustment through the rheostat movable tap can change the gain of the entire proportional amplifying and control block (i.e., circuits 131 and 138). Within the linear operating range of 131, the output over conductor 142 is a current $I_p$ comprising the slip signal which is proportional to the instantaneous magnitude of any $V_{DC}$ deviation outside the deadband. During an undervoltage condition, the representative control signal $V_E$ is positive and $I_p$ is poled in the direction of arrow 143. When an overvoltage condition occurs, $V_E$ is negative and $I_p$ is poled in the direction opposite to the direction of arrow 143. The efficacy of such an arrangement will be demonstrated hereinafter.

The representative control signal $V_E$ is also applied through linking and limiting resistor 116 and conductor 117 to the negative input of an operational amplifier 118. A capacitor 121 is coupled across the operational amplifier 118, as shown, and it is shunted by a resistor 119 which is operative to control the discharge of 121 when $V_E$ goes to zero upon return of normal input power following a short term outage. Amplifier 118, resistors 116 and 119 and capacitor 121 comprise the integrating or slew amplifier 122 which will provide essentially a ramp output voltage over conductor 123 for a given magnitude of $V_g$, and these parameters determine the initial slope of the ramp. The output from amplifier 122 is proportional to the integral of $V_g$, and it is applied to a transfer circuit 124. Transfer circuit 124 includes a rheostat 125 having one fixed end coupled to conductor 123, another fixed end coupled to R, and a movable tap coupled to a resistor 126. Transfer circuit 124 operates to convert or transfer the output voltage from amplifier 122 to a current $I_i$ usable to effect a change in oscillator frequency. Additionally, the adjustment through the rheostat 125 movable tap can change the gain of the entire integrating amplifying and control block (i.e., circuits 122 and 124). Hence in the presence of a control signal $V_g$, the current $I_i$ in conductor 128 is the slew signal which is proportional to the integral of the deviation magnitude of $V_{DC}$. During an undervoltage condition, $I_i$ is poled in the direction of arrow 129, but when an overvoltage condition occurs, it is poled oppositely.

The frequency control circuit of our invention also receives from the reference means 160 a current signal $I_r$ over conductor 162, and the magnitude of this reference signal can be varied to change the frequency of the oscillator 180 as desired. Means 160 may include a rheostat 164 having one fixed end coupled by conductor 163 to the relatively positive supply voltage terminal, the other fixed end coupled to conductor 162, and a movable tap for varying the magnitude of $I_r$.

Reference signal $I_r$, slip signal $I_p$, and slew signal $I_i$, are summed at point 170, and the net current $I_c$ is a control signal whose magnitude will determine the instantaneous frequency of the inverter 40. During normal inverter operation, the DC bus voltage is within deadband, $I_p$ and $I_i$ are zero, and the operator may vary the inverter frequency by varying the magnitude of $I_r$. During an input power failure, $V_{DC}$ will fall below the lower limit of the deadband and the resulting signals $I_p$ and $I_i$ are applied to 170 in a sense opposing $I_r$, thereby reducing the frequency control signal $I_c$ and lowering the inverter frequency below the rotor frequency of the connected motors which are now coasting, whereupon the inertial energy in the motor load will supply inverter losses and prevent further reduction of $V_{DC}$. When input power is subsequently restored, $V_{DC}$ may "overshoot," in which event a slip signal $I_p$ representing the deviation of $V_{DC}$ above the upper limit of the deadband will be applied to 170 in a sense aiding $I_r$ and thereby tending to raise the inverter frequency.

The summation means 170 is part of the frequency varying means comprising a variable frequency oscillator 180 to which the frequency control signal $I_c$ is coupled over conductor 182. The oscillator 180 is operative to provide a periodic output signal over conductor 62, which output signal has a frequency that varies with the magnitude of the algebraic sum of $I_r$, $I_p$ and $I_i$, and which frequency determines the inverter frequency through gating circuit 70. For this purpose the oscillator 180 can take any suitable form, such as a frequency modulated digital counter. In the practical embodiment shown in FIG. 4, it comprises a unijunction transistor 184 that fires when the input voltage at emitter 184e (i.e., the voltage across capacitor 185) reaches a certain ratio of the supply voltage. When this occurs, unijunction 184 fires, discharging capacitor 185 and causing a current to flow through the transistor output terminals 186 and 187. The current output through terminal 186 causes a pulse of current to flow through resistor 188. The current flow through resistor 188 in turn causes a voltage pulse to be fed into capacitor 189. The voltage pulse into capacitor 189 causes a discharge through resistor 191, and the base-emitter junction of transistor 192 conducts. Output current flows through resistors 193 and 194, and the potential across resistor 194 is coupled across the primary 195p of transformer 195. The secondary output voltage pulse (across 195s is applied over conductor 62 to gating circuit 70, and is operative to control the frequency of inverter 40. The pulse rate of this output signal is directly proportional to the magnitude of the input current to the oscillator 180. The input current is the frequency control signal $I_c$ applied over conductor 182 to the emitter 197e of a transistor 197 which controls the charging rate of capacitor 185.

Figure 6:
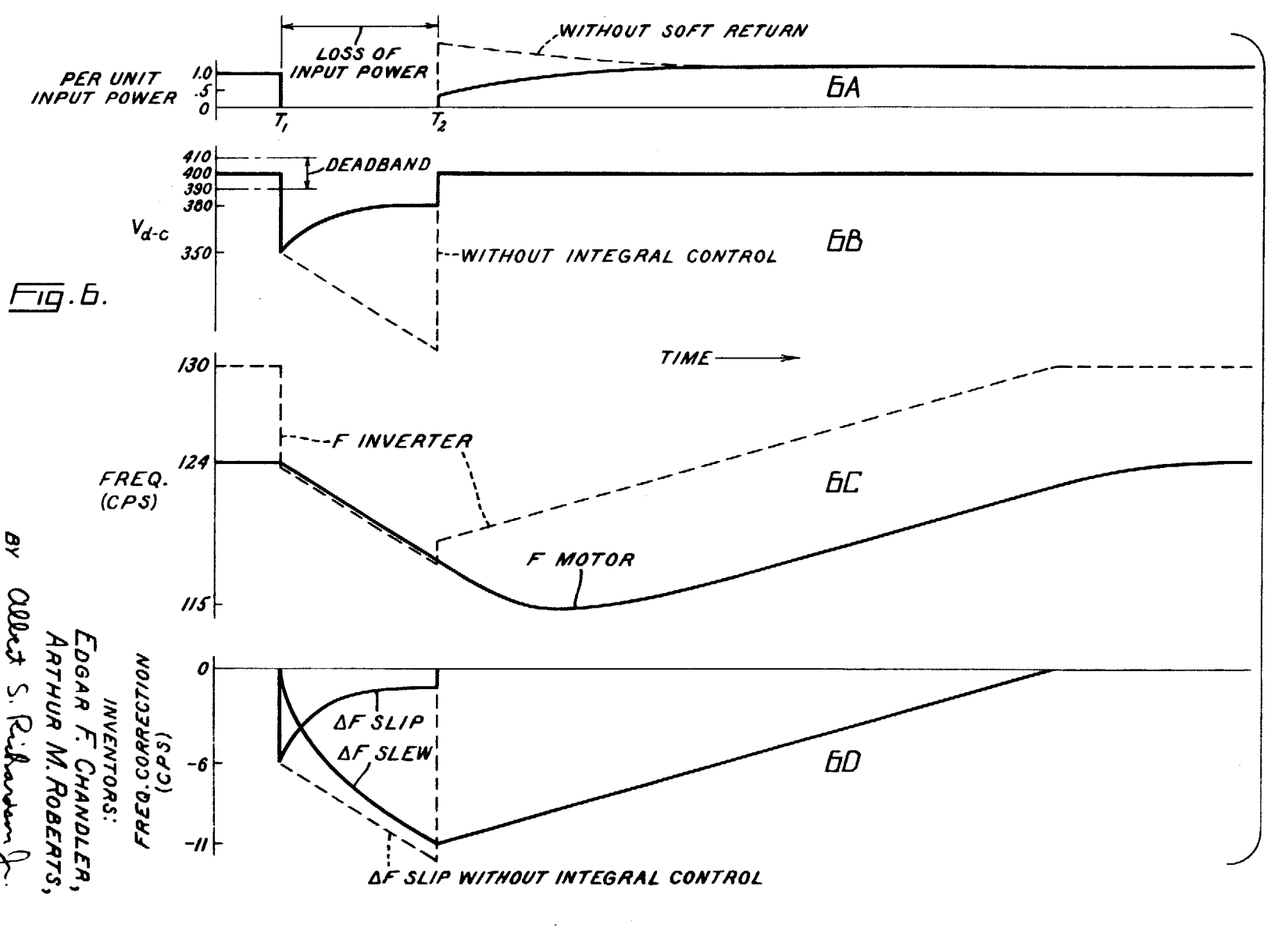
FIG. 6A—6D are graphic illustrations useful in understanding the operation of the invention.

The operation of the invention may be better understood by referring to FIGS. 6A through 6D. As is shown in FIG. 6A, normal input power to the inverter is maintained until time $T_1$, is interrupted during the period $T_1$ to $T_2$, and returns at $T_2$. As is indicated in FIG. 6B, when input power is lost the DC bus voltage collapses very rapidly (due to the absence of significant stored energy in the filter capacitor C or within the inverter). When $V_{DC}$ falls below the low deadband setpoint of 390 volts, the ridethrough circuit becomes activated and the proportional "slip" signal $I_p$ is immediately effective to reduce inverter frequency very rapidly, as is shown by the broken line in FIG. 6C. As soon as the inverter frequency becomes less than the rotor frequency of the motor, a regenerative state is obtained and power flows backwards from the load into the AC output terminals of the inverter. It should be noted that this operation is similar for synchronous motors (negative torque angle) and induction motors (negative slip frequency). The regenerated energy retards further reduction of $V_{DC}$. By now the "slew" signal $I_i$ has attained sufficient magnitude to change the control signal $I_c$ and hence the inverter frequency at a rate approaching the natural coast down rate of the motor load with less contribution from $I_p$, and consequently regeneration is so controlled that $V_{DC}$ can actually increase to minimize its excursion below the lower setpoint. In effect our control scheme regulates $V_{DC}$ during the ridethrough period $T_1-T_2$.

FIG. 6D shows the respective contributions of the proportional control of circuit 130 and of the integral control of circuit 120 during ridethrough with a complete loss of input power. The effect of a ridethrough circuit having only proportional control ($I_p$) may be seen by referring to the broken lines in FIGS. 6B and 6D. As can be seen, the proportional control is initially dominant but is soon superseded by the integral control which has a more gradual but longer lasting effect. One of the main purposes of the proportional signal $I_p$ is to rapidly unload the inverter following a loss of input power. Hence the abrupt initial frequency correction is largely provided by $I_p$. Later the slew signal $I_i$ takes over and allows the inverter frequency to match the ridethrough or coast ramp of the motor load with minimum proportional error. By the time input power is restored, at time $T_2$, the magnitude of $I_i$ will be nearly an identical analog of the deviation from normal motor speed at that instant, and transients of minimum severity accompany restoration of input power. The resulting soft return of power is indicated in FIG. 6A where the dashed line shows input power without soft return. After $T_2$, the slew signal $I_i$ will gradually decay to program frequency back to the original level determined by $I_r$. If $V_{DC}$ overshoots its high deadband setpoint of 410 volts, a negative control signal $V_e$ is produced, and the rate at which frequency is increased will be forced higher as a result of the faster decrease of opposing $I_i$ and the imposition of an aiding $I_p$ (limited to a predetermined maximum by saturation of the circuit 130). Another advantage of the integral control is that during the coasting interval it minimizes the excursion of $V_{DC}$, thereby preserving the inverter commutating ability. It should also be noted that in the absence of integral control, the severity of recovery transient will increase as the duration of the input power loss increases.

Throughout the ridethrough period, the illustrated voltage control circuit 85 is operative to adjust the magnitude of the inverter output voltage as necessary to preserve a desired constant magnitude-to-frequency ratio. In another embodiment of our invention, this voltage control is exercised on a thyristor bridge which may be substituted for the diode rectifier 20 shown in FIG. 2 in order to supply variable DC voltage to the input terminals of the inverter 40. In this case the illustrated frequency control circuit should be modified by adding means for recalibrating the normal threshold level of the voltage sensing network 91 with motor speed (e.g., by changing in effect the setting of rheostat 100 as a function of the frequency control signal $I_c$). In other words, the control would be programmed so that the minimum deadband setting decreases as the motors coast down, whereby both frequency and DC bus voltage will decline in an orderly manner during input power interruptions, even though the normal voltage control means is then ineffectual.

While the aforementioned operation has been described for a complete loss of input power, it will be appreciated by those skilled in the art that the ridethrough circuit of our invention operates equally efficaciously during a partial loss of input power of an abnormal rise in the DC bus voltage. The latter situation is caused by over regeneration due to an overhauling load or too rapid deceleration, in which event our frequency control circuit will be automatically activated by $V_{DC}$ rising above the upper voltage setpoint and will then produce signals $I_p$ and $I_t$ which aid $I_r$ so as to effect a corrective change in the inverter frequency. For example, if the magnitude of $I_r$ were lowered at a rate exceeding the natural coasting rate of the motor load, the resulting signals $I_p$ and $I_t$ will sustain a frequency control signal $I_c$ of proper magnitude to limit the reduction of frequency to just the rate that allows circuit losses to dissipate the regenerated energy. In this manner frequency is regulated so as to minimize the deviation of $V_{DC}$ above the deadband.

While only a particular form of our invention has been fully described and illustrated, it will be obvious to those skilled in the art that various modifications and alterations may be made therein. Hence the concluding part of this specification is intended to cover all such modifications and alterations as may fall within the true spirit and scope of the invention.

What we claim and desire to secure by Letters Patent of the United States is:

1. In a control circuit for a variable frequency inverter which comprises a plurality of controlled switching elements interconnecting a DC bus and a set of AC terminals, said DC bus normally being energized by a source of electric power and said AC terminals being adapted to be connected to a variable speed electric motor load, the improvement which comprises:
   a. means including a variable frequency oscillator for supplying said switching elements with gate pulses which turn on said elements in a predetermined sequence and at a frequency determined by the frequency of said oscillator;
   b. means for providing a reference signal whose magnitude can be varied to change the frequency of said oscillator as desired,
   c. first means responsive to the voltage of said DC bus for providing a first signal representing the magnitude of deviation of said voltage from a predetermined magnitude range;
   d. second means responsive to said DC bus voltage for providing a second signal representing the integral of said deviation magnitude; and
   e. means for varying the frequency of said oscillator according to the sum of said first, second and reference signals.

2. The improvement defined in claim 1 wherein said source of electric power includes a power rectifier having input terminals adapted to be energized by a source of AC power, said rectifier including output capacitance means coupled to said DC bus, the voltage across said capacitance means being regulated by said control circuit.

3. The improvement defined in claim 1 wherein said first and second means include in common (i) voltage sensing means for monitoring said DC bus and (ii) a voltage deadband circuit connected to said sensing means for establishing said predetermined magnitude range, said deadband circuit being operative whenever said DC bus voltage is below a first voltage setpoint to produce a control signal having a certain polarity and a magnitude proportional to the magnitude difference between said DC bus voltage and said setpoint, said first and second means being so constructed and arranged that said first and second signals are proportional respectively to the magnitude of said control signal and to the integral of said magnitude and are both applied to said frequency varying means in a sense opposing said reference signal.

4. The improvement defined in claim 3 wherein said deadband circuit is also operative whenever said DC bus voltage is above a second, relatively high voltage setpoint to produce said control signal which then has a polarity opposite said certain polarity and a magnitude proportional to the difference between said DC bus voltage and said second setpoint, said first means being so arranged that said first signal is applied to said frequency varying means in a sense aiding said reference signal whenever said control signal has said opposite polarity.

5. The improvement defined in claim 1 wherein said first and second means include in common (i) voltage sensing means for monitoring said DC bus and (ii) a voltage deadband circuit connected to said sensing means for establishing said predetermined magnitude range, said deadband circuit being operative whenever said DC bus voltage is above a predetermined setpoint to produce a control signal having a certain polarity and a magnitude proportional to the magnitude difference between said DC bus voltage and said setpoint, said first and second means being so constructed and arranged that said first and second signals are proportional respectively to the magnitude of said control signal and to the integral of said magnitude and are both applied to said frequency varying means in a sense aiding said reference signal.

6. In a system for maintaining variable frequency electric power to an AC machine from an electric power converter, said converter having DC input terminals, AC output terminals, and controlled switching elements arranged to provide conductive paths between said input and output terminals, said DC terminals normally being energized by a source of power, the improvement which comprises:
   a. gating means coupled to said switching elements for providing gating signals thereto, the frequency of said gating signals determining the actual frequency of said converter;
   b. a voltage sensitive frequency regulator comprising
      i. first means for providing a reference signal having a magnitude related to a desired frequency,
      ii. voltage sensing means coupled to said source of power for producing a first control signal representing the amount and direction of any input voltage magnitude excursion beyond predetermined limits, and
      iii. output signal providing means coupled to receive said reference and control signals and including integrating means for producing a second control signal representing the integral of said first control signal, said output signal providing means being operative to provide an output signal having a frequency dependent on the sum of the magnitudes of said reference signal, said first control signal, and said second control signal; and
   c. means applying said output signal to said gating means for controlling the frequency of said gating signals.

7. The improvement defined in claim 6 wherein additional means is provided for controlling the magnitude of voltage at said AC output terminals as a function of the actual frequency of said converter.

8. The improvement defined in claim 6 wherein said voltage sensing means includes an undervoltage detector for sensing an input voltage excursion below a lower voltage setpoint, and an overvoltage detector for sensing an input voltage excursion above an upper voltage setpoint.

9. The improvement defined in claim 8 wherein said output signal providing means is so constructed and arranged that the control signal produced upon operation of said undervoltage detector tends to decrease the output signal frequency while the control signal produced upon operation of said overvoltage detector tends to increase the output signal frequency.

10. In a system for maintaining variable frequency electric power to an AC machine from an electric power converter, said converter having DC input terminals, AC output terminals, controlled switching elements arranged to provide conductive paths between said input and output terminals, and gating means coupled to said switching elements for providing gating signals thereto, the frequency of said gating signals determining the frequency of said converter, an improved voltage sensitive frequency regulator comprising :

a. voltage sensing means responsive to the voltage of said DC terminals for providing a control signal representing the magnitude of deviation of said voltage from a given value;

b. proportional amplifying means coupled to receive said representative control signal and operative to provide a second control signal having a magnitude substantially proportional to the magnitude of said representative control signal;

c. integrating amplifying means coupled to receive said representative control signal and operative to provide a third control signal having a magnitude substantially equal to the integral of said representative control signal;

d. means for providing a reference signal having a magnitude related to a desired frequency;

e. a variable frequency source having input means coupled to receive said reference signal, said second control signal and said third control signal and having an output for providing an output signal having a frequency that depends on the magnitudes of said signals received over said input means, and f. means for applying said output signal to said gating means to control the frequency of said converter.

11. In a control circuit for a variable frequency inverter which comprises a plurality of controlled switching elements interconnecting a DC bus and a set of AC terminals, said DC bus normally being energized by a source of electric power and said AC terminals being adapted to be connected to a variable speed electric motor load having a predetermined natural coast-down rate, and gating means coupled to said switching elements for cyclically triggering the same in a predetermined sequence, the improvement which comprises:

a. control means coupled to said gating means and responsive to a given frequency reference signal for normally determining the operating frequency of the inverter according to the magnitude of said signal, said control means including b. coasting means coupled to said DC bus and responsive to deenergization thereof by said source of power for reducing said frequency initially just enough to permit regeneration by said motor load and thereafter at a rate approaching said coast-down rate, said coasting means including c. means operative upon reenergization of said DC bus by said source for ensuring a gradual increase of said frequency to a level determined by the magnitude of said frequency reference signal.

12. The improvement defined in claim 11 wherein said coasting means comprises means for reducing said frequency by an amount proportional to the sum of the deviation of the DC bus voltage below a predetermined minimum limit and the integral of said deviation.